United States Patent [19]

Havard

[11] Patent Number: 4,826,437

[45] Date of Patent: May 2, 1989

[54] EDUCATIONAL GAME FOR TEACHING PHONETICS

[76] Inventor: Janet Havard, 1467 W. Hall Ave., Slidell, La. 70460

[21] Appl. No.: 100,626

[22] Filed: Sep. 24, 1987

[51] Int. Cl.⁴ .......................... G09B 17/00; A63F 1/02
[52] U.S. Cl. ..................................... 434/167; 273/302
[58] Field of Search ...................... 434/167, 171, 172; 273/292, 299, 302, 308

[56] References Cited

U.S. PATENT DOCUMENTS 1,542,819  6/1925  Bloom .................................. 273/299
4,030,211  6/1977  McGinley ........................... 434/167
4,643,679  2/1987  Tatum .............................. 434/184 X Primary Examiner—William H. Grieb
Attorney, Agent, or Firm—Keaty & Keaty

[57] ABSTRACT

An educational game for teaching phonetics is provided. The game provides for the use of a deck of cards having at least one main card for each player and a plurality of secondary cards. The main cards have an indicia representing a number of phonetic tasks and the secondary cards bear an indicia representing a matching phonetic task.

5 Claims, 1 Drawing Sheet

EDUCATIONAL GAME FOR TEACHING PHONETICS

BACKGROUND OF THE INVENTION

1. Field of the Invention

This invention relates to an educational game for teaching phonetics.

More particularly, the game is concerned with a method of sound association which will help the players learn their sounds more quickly and to associate those sounds with certain letter groupings.

Perception and observation occur through our senses. These perceptions and observations when organized into a meaningful manner become a concept. There is an accepted theory that once a concept is established, it is relatively permanent. It is well established and generally accepted, with children of normal intelligence or even with slow learners, that teaching must be rigidly structured. The game disclosed herein addresses a problem from a perceptional view point and is structured to establish concepts to enhance these perceptions.

These principles or concepts include spelling words in colored letters, using letters of different sizes and types, placing the letters at different angles, using words divided by varying sounds and segmenting letters of words.

There are many games and instructional materials for reading, phonetics, and word and letter association. Some games have the players compete to form words from letter elements drawn or dealt to them and are educational, as well as entertaining. In the commonly known games of that type, the individual letter elements contain a single letter, and the elements are played either in single sequences or in a cross word pattern depending on the particular game. Some of these games have required playing boards and letter blocks of relatively small size to permit large numbers of the blocks made out serially in a different row of patterns on a board of convenient size. Other proposals involve the use of decks of playing cards bearing indicia letters of the alphabets and adapted to be spread out on the table in serial arrangements to make up different words. Still, others involve decks of playing cards bearing common word components that are dealt out and are used to formulate words and scoring is based and enumerated by a chart relating the number of cards used to make a word to either a predetermined point value or a respective and in poker.

It is difficult when a number of players are required and single boards or card tables give rise to a space problem.

SUMMARY OF THE INVENTION

The present invention relates to educational matter embodying one or more principles and concepts outlined above.

The educational device provides for the use of a stack of cards having at least one main card and a plurality of secondary cards. The main card has an indicia thereon representing a phonetic task, for example having a letter or a combination of letters representing a sound or a digraph underlined and forming a part of a word.

A matching phonetic task is printed on one of the secondary cards and a player retrieves a secondary card from a stack of cards. If the indicia on the face side of secondary card matches one of the phonetic tasks on the main card, the player places the secondary card on the main card, continuing to play until all tasks of the main card are matched by the tasks on the secondary card.

A suitable releasable securing means such as for example a Velcro strip can be attached to the reverse side of the secondary card and along an edge of the main card.

It is an object of the present invention to provide a training device for word/letter and sound association, which is both educational and entertaining.

It is another object of the present invention to provide a game which is compact and easily transportable, and can be played while travelling or where space is restrictive.

BRIEF DESCRIPTION OF THE DRAWINGS

The details of the this invention will be evidenced from a detailed description taken in conjunction with the appended drawings, in which.

DETAILED DESCRIPTION OF THE PREFERRED EMBODIMENT

Figure 1:
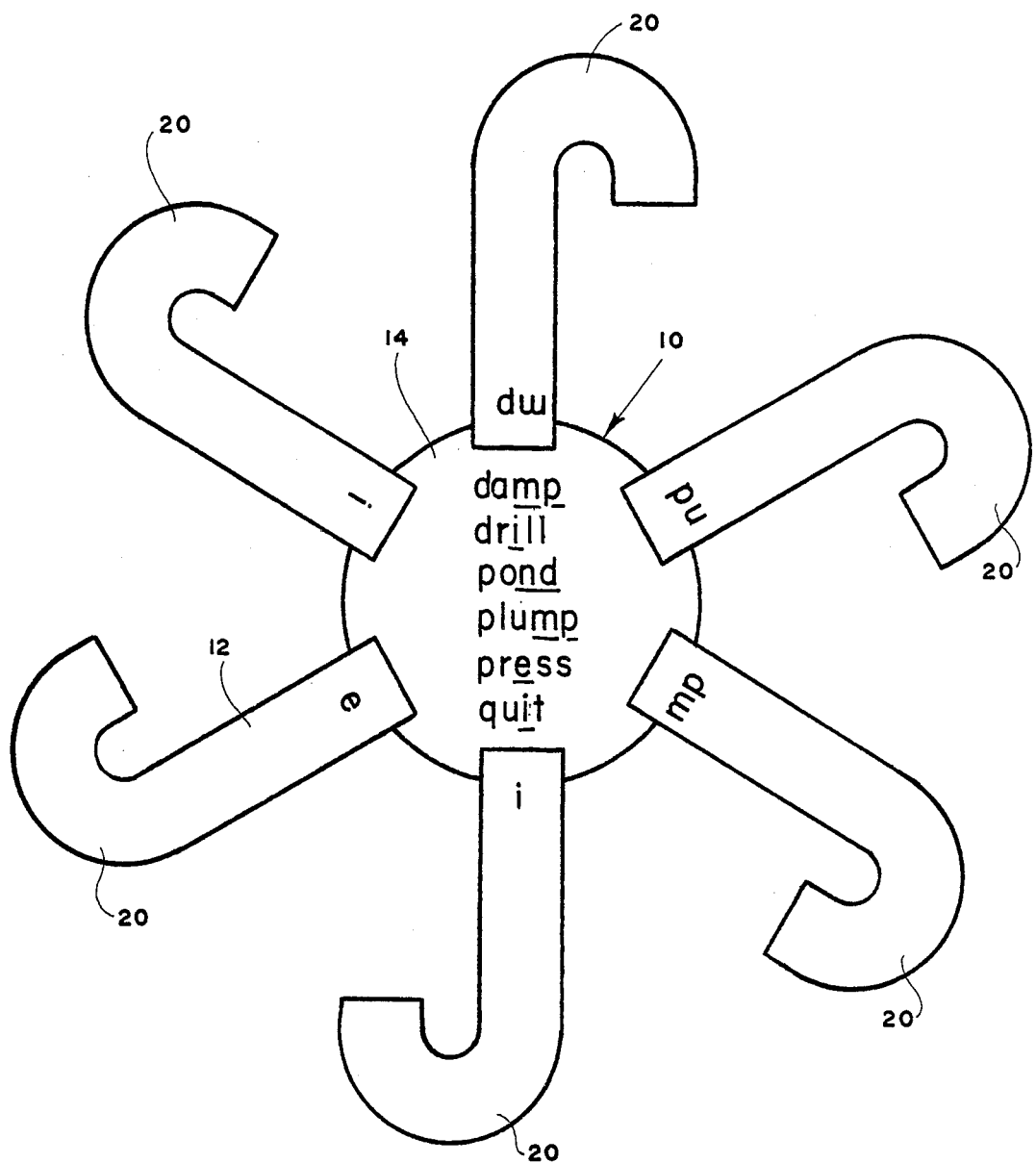
FIG. 1 is a front view of the preferred embodiment wherein the player has satisfied the game requirements for winning.

In the following description of the preferred embodiment, the players select one main card 10. Then secondary cards 20 are placed in a stack with their faces 12 down. Each player in turn draws one secondary card 20 from the stack. The rest of the players read aloud the indicia on the secondary card, thus memorizing the sound in association with the letters, letter combinations or digraphs. The player who drew the card enjoys cooperation of other players, which makes the game more enjoyable. He, at the same time, receives the peer instruction without pressure being put on him for correct response. Such arrangement enables the player to participate in the game without any threat to his self-esteem for not knowing sometimes the correct answers. If the letters or a group of letters/diagraphs, which are located on the face side 12 of the secondary card 20, match an underlined letter or group of letters on the player's main card 10, the player keeps the secondary card and places it on his main card 10 securing it to the main card by an adhesive means (not shown) so that the reverse side of the secondary card 20 rests adjacent an edge of the main card 10. Suitable mating adhesive means is secured to the face 14 of the main card 10. The adhesive can be in the form of hook and loop fasteners, such as, for example, Velcro. The main card 10 may be made of any suitable material, for example felt or a similar thick fabric. The secondary cards 20 can be likewise made of felt having strips of Velcro attached to their reverse sides.

In this manner, the position of the secondary cards 20 in relation to the main card 10 can be secured, which may prove especially beneficial if the game is played during travelling.

If the indicia on the secondary card 20 retrieved from the stack does not match any of the underlined indicia on the main card 10, the player discards the secondary card 20 in a second stack.

The object of the game is to match a secondary card 20 to each of the underlined letters or group of letters on a player's main card 10. The first person to complete the match of the secondary cards to the underlined indicia on his main card 10 wins the game.

In the embodiment shown in FIG. 1, the main card 10 is shown as having a round shape, while the secondary cards 20 are shown as having a generally J-shape. These shapes can be changed to any other suitable shape, for example, the main card 10 and the secondary cards 20 can be made both rectangular or both round, etc. It is preferable though that the indicia on the secondary cards be adjacent one end thereof, if the card is made J-shaped or rectangular, so that this end can be placed in close proximity to the underlined indicia on the main card 10 and easy visual association be made between the indicia on the secondary card 20 and the underlined indicia on the main card 10.

The cards can be made of different color/texture material, so that the players are entertained while educating themselves. The underlined indicia on the main card can be written with a different color print, and the matching indicia on the secondary card matches that in color.

While the invention has been described with a certain degree of particularity, it is manifest that many changes can be made in the details of construction and the arrangement of components. It is therefore understood that the invention is not to be limited to specific embodiments disclosed herein, but the invention is to be limited only by the scope of the following claims, including the full range of equivalency to which each element or step thereof is entitled to.

I claim:

1. A deck of playing cards for use in an educational game, said deck of cards, comprising:
   at least one main card, having indicia representing phonetics task; and
   a plurality of secondary cards, each having an indicia matching at least part of the phonetics task of the main card, said cards having securing means for releasably securing the secondary cards to the main card.

2. The device of claim 1, wherein said secondary cards have indicia representing letters making up vowels sounds and patterns or digraphs.

3. The device of claim 1, wherein said main card is round-shaped.

4. The device of claim 1, wherein said secondary cards each have a general J-shape.

5. The device of claim 1, wherein said securing means is attached adjacent one end of the secondary card and a mating securing means is attached adjacent an edge of the main card.

* * * * *